United States Patent
Wan et al.

(10) Patent No.: US 9,923,874 B2
(45) Date of Patent: Mar. 20, 2018

(54) PACKET OBFUSCATION AND PACKET FORWARDING

(71) Applicant: Huawei Technologies Co., Ltd., Shenzhen (CN)

(72) Inventors: Tao Wan, Ottawa (CA); Peter Ashwood-Smith, Gatineau (CA); Wen Tong, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/633,299

(22) Filed: Feb. 27, 2015

(65) Prior Publication Data
US 2016/0255054 A1 Sep. 1, 2016

(51) Int. Cl.
*H04L 29/06* (2006.01)
*H04L 12/721* (2013.01)
*H04L 12/741* (2013.01)

(52) U.S. Cl.
CPC ........ *H04L 63/0428* (2013.01); *H04L 45/566* (2013.01); *H04L 45/74* (2013.01); *H04L 63/0414* (2013.01)

(58) Field of Classification Search
CPC ... H04L 63/0428; H04L 45/566; H04L 45/74; H04L 63/0414
USPC ............................................ 713/160; 726/26
See application file for complete search history.

(56) References Cited

U.S. PATENT DOCUMENTS

| | | | | |
|---|---|---|---|---|
| 8,397,065 B2* | 3/2013 | Lin | ................. | H04L 12/4633 713/150 |
| 2005/0163079 A1* | 7/2005 | Taniuchi | ................. | H04W 8/02 370/331 |
| 2005/0235145 A1* | 10/2005 | Slick | ................. | H04L 63/0428 713/165 |

(Continued)

FOREIGN PATENT DOCUMENTS

| | | |
|---|---|---|
| CN | 1805333 A | 7/2006 |
| CN | 104283757 A | 1/2015 |

OTHER PUBLICATIONS

Foreign Communication From A Counterpart Application, PCT Application No. PCT/CN2016/074647, International Search Report dated May 30, 2016, 7 pages.

(Continued)

*Primary Examiner* — Sarah Su
(74) *Attorney, Agent, or Firm* — Slater Matsil, LLP

(57) ABSTRACT

A packet obfuscation method comprising receiving a data packet having a routing header portion and a payload portion, performing a first obfuscation on the routing header portion to generate an obfuscated routing header portion, performing a second obfuscation on at least the payload portion to generate an obfuscated payload portion, and combining the obfuscated routing header portion and the obfuscated payload portion to form an obfuscated packet. A packet forwarding method comprising obfuscating routing information using a packet obfuscation function, generating a plurality of forwarding rule entries in accordance with the obfuscated routing information, transmitting the plurality of forwarding rule entries to at least one network node in a network, transmitting the packet obfuscation function to at least one network node in the network, and transmitting a de-obfuscation function to at least one network node in the network.

25 Claims, 4 Drawing Sheets

(56) References Cited

U.S. PATENT DOCUMENTS

| | | | |
|---|---|---|---|
| 2006/0007879 A1* | 1/2006 | Watanabe | H04L 29/12188 370/328 |
| 2006/0101262 A1* | 5/2006 | Haney | H04L 12/4633 713/153 |
| 2006/0153375 A1 | 7/2006 | Yi | |
| 2006/0159088 A1* | 7/2006 | Aghvami | H04L 45/24 370/389 |
| 2007/0277240 A1* | 11/2007 | Durfee | G06F 21/577 726/24 |
| 2008/0022389 A1* | 1/2008 | Calcev | H04L 63/045 726/14 |
| 2009/0103734 A1 | 4/2009 | Hammell et al. | |
| 2009/0228708 A1 | 9/2009 | Trostle | |
| 2009/0313465 A1* | 12/2009 | Verma | H04L 63/0428 713/153 |
| 2010/0250930 A1* | 9/2010 | Csaszar | H04L 29/12066 713/168 |
| 2011/0179277 A1* | 7/2011 | Haddad | H04L 45/60 713/171 |
| 2012/0084464 A1* | 4/2012 | Cochinwala | H04L 43/026 709/246 |
| 2013/0263249 A1* | 10/2013 | Song | H04L 63/18 726/14 |
| 2013/0301827 A1* | 11/2013 | Mueller | H04L 9/28 380/28 |
| 2014/0122874 A1* | 5/2014 | Janakiraman | H04W 12/00 713/160 |
| 2014/0281505 A1* | 9/2014 | Zhang | H04L 9/3268 713/158 |
| 2016/0036700 A1* | 2/2016 | Unnimadhavan | H04L 45/74 370/392 |
| 2016/0094357 A1* | 3/2016 | Yamato | H04L 12/4625 370/241 |

OTHER PUBLICATIONS

Foreign Communication From A Counterpart Application, PCT Application No. PCT/CN2016/074647, Written Opinion dated May 30, 2016, 4 pages.

* cited by examiner

PACKET OBFUSCATION AND PACKET FORWARDING

BACKGROUND

In a network, network nodes are vulnerable to attacks and/or backdoors that allow an attacker to remotely control a network node and/or to steal data traffic from the network node, resulting in loss of data and privacy. For example, an attacker may employ a forwarding network node to exploit transit traffic that is sent through a network. Transit traffic refers to data traffic that passes through a forwarding network node without terminating at the forwarding network node. Non-transit traffic refers to data traffic that terminates at the forwarding network node. Data packets may be taken from the forwarding network node and copied or sent to another destination. For instance, an attacker may tamper with an existing packet header (e.g., modifying an Internet Protocol (IP) address) or encapsulate a data packet with a new packet header (e.g., using IP in IP addressing).

To increase security, a network operator may use hop-by-hop encryption which provides packet confidentiality over network links, but does not provide packet confidentiality within a network node. Alternatively, a network operator may use site-to-site encryption which provides confidentiality over both network links and within transit routers. However, site-to-site encryption does not encrypt packet header information, and does not prevent protected traffic from being stolen for further analysis, for example offline decryption. End-to-end encryption may be used by a traffic owner to provide payload confidentiality. However, end-to-end encryption does not provide confidentiality for packet headers or traffic metadata and does not prevent encrypted traffic from being stolen for further analysis.

SUMMARY

In one embodiment, the disclosure includes a packet obfuscation method comprising receiving a data packet having a routing header portion and a payload portion, performing a first obfuscation on the routing header portion to generate an obfuscated routing header portion, performing a second obfuscation on at least the payload portion to generate an obfuscated payload portion, and combining the obfuscated routing header portion and the obfuscated payload portion to form an obfuscated packet.

In another embodiment, the disclosure includes a packet forwarding method comprising receiving an obfuscated data packet comprising obfuscated routing information, identifying a forwarding rule entry that corresponds with the obfuscated routing information from a plurality of forwarding rule entries, and transmitting the obfuscated data packet in accordance with the forwarding rule entry.

In yet another embodiment, the disclosure includes an apparatus comprising a transmitter, a processor coupled to a memory and the transmitter, wherein the memory comprises computer executable instructions stored in a non-transitory computer readable medium such that when executed by the processor causes the processor to obfuscate routing information using a packet obfuscation function, generating a plurality of forwarding rule entries in accordance with the obfuscated routing information, transmit the plurality of forwarding rule entries to at least one network node in a network, transmit the packet obfuscation function to at least one network node in the network, and transmit a de-obfuscation function to at least one network node in the network.

In yet another embodiment, the disclosure includes a packet forwarding method comprising obfuscating routing information using a packet obfuscation function, generating a plurality of forwarding rule entries in accordance with the obfuscated routing information, transmitting the plurality of forwarding rule entries to at least one network node in a network, transmitting the packet obfuscation function to at least one network node in the network, and transmitting a de-obfuscation function to at least one network node in the network.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for obfuscating data packets using encrypting, hashing, and other data scrambling techniques, routing obfuscated data packets through a network, and de-obfuscating the data packets. Obfuscating data packets protects the privacy of the data packets, including both their header and payloads. It may also prevent attackers from stealing and forwarding data traffic by obfuscating the data traffic, such that, the header cannot be predicted, tampered with, or forged. Packet obfuscation obfuscates both packet headers and payloads, and may employ protocol oblivious forwarding (PoF). PoF forwards data packets through a network without the need to understand the header formats of the data packet. PoF allows forwarding data packets based on the value in a particular segment of the stream identified, for example, by an offset and a length. Obfuscating data packets provides an additional layer of protection during transit which may improve privacy. Resources for securing forwarding devices and costs for a carrier may be reduced. Obfuscating data packets using packet obfuscation allows vendors to provide network nodes to carriers without having the devices being fully trusted by the carrier which may increase revenue for vendors. In an embodiment, a network node may obtain a packet obfuscation function, receive a data packet, obfuscate the data packet using the packet obfuscation function, identify a forwarding rule entry using an obfuscated routing header, and transmit the obfuscated data packets in accordance with the forwarding rule entry. In another embodiment, a network node may receive an obfuscated data packet, to identify a forwarding rule entry using an obfuscated routing header, and to transmit the obfuscated data packet in accordance with the forwarding rule entry. In yet another embodiment, a network node may receive an obfuscated data packet and de-obfuscate the obfuscated data packet using a de-obfuscation function.

Figure 1:
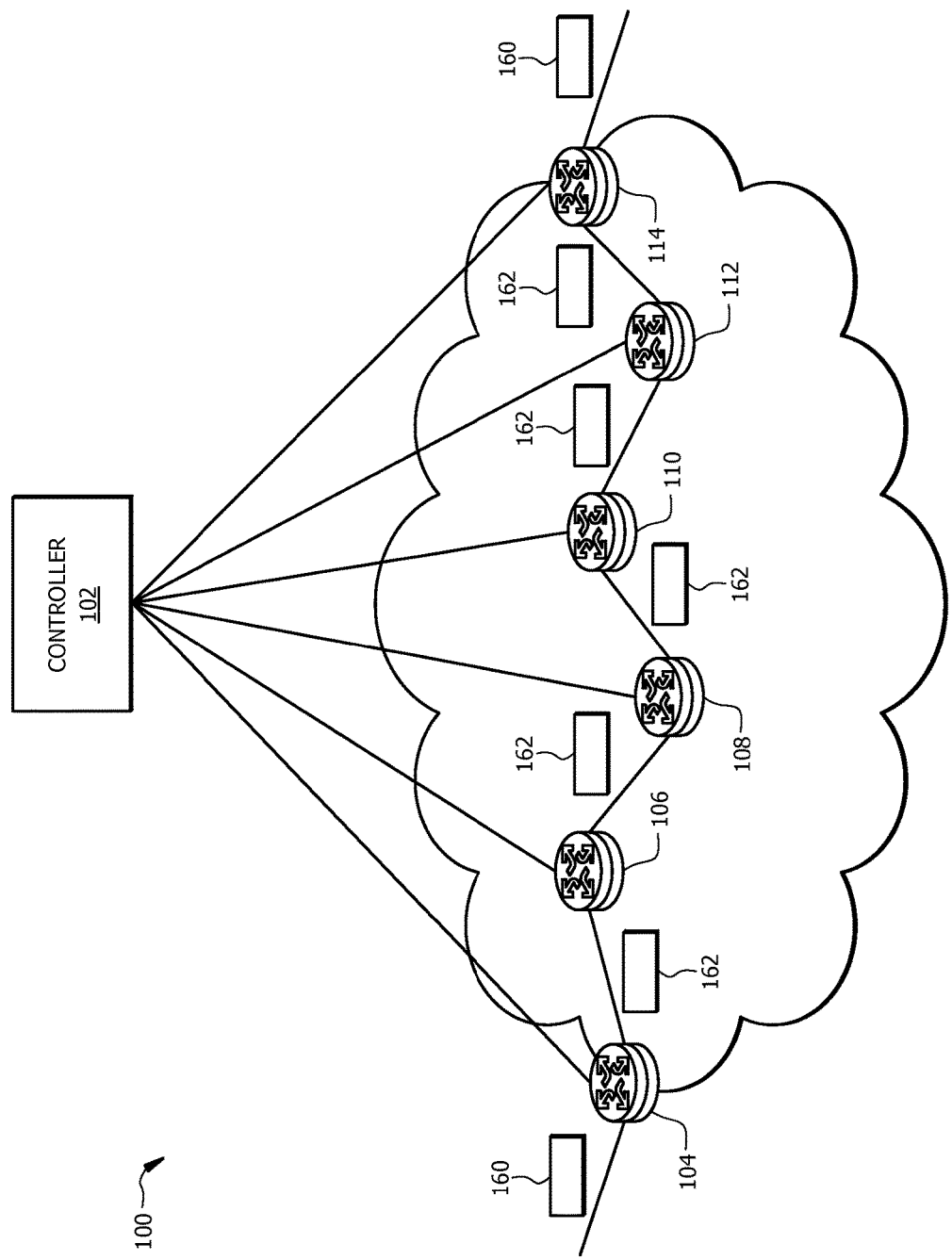
FIG. 1 is a schematic diagram of an embodiment of a system implementing packet obfuscation.

FIG. 1 is a schematic diagram of an embodiment of system 100 implementing packet obfuscation. System 100 comprises a controller 102, and a plurality of network nodes 104-114. Controller 102 is a centralized controller (e.g., a software-defined network (SDN) controller) and is in communication with network nodes 104-114. Controller 102 is configured to provide a packet obfuscation function, a de-obfuscation function, one or more keys, and/or forwarding rules to network nodes 104-114. The network nodes 104-114 may be any devices and/or components that support the transportation of data packets through the system 100. For example, network node 104 is an ingress network node and network node 114 is an egress network node when data traffic is configured to flow from network node 104 to network node 114. In some embodiments, network nodes 104-114 comprise switches, routers, any other suitable network devices for communicating data packets, or combinations thereof, as would be appreciated by one of ordinary skill in the art upon viewing this disclosure. In an embodiment, network nodes 104-114 are configured with a packet obfuscation function. In another embodiment, network nodes 104-114 are configured to receive the packet obfuscation function from controller 102. One or more of the network nodes 104-114 are configured to obtain a packet obfuscation function and forwarding rule entries, to obfuscate data packets using a packet obfuscation function, to identify a forwarding rule entry using a predetermined portion of the obfuscated data packet, and to transmit the obfuscated data packet in accordance with the forwarding rule entry. In an embodiment, the obfuscated routing information occupies the same position in the obfuscated data packet as the original routing information in the original data packet. Further, one or more of the network nodes 104-114 are configured to obtain forwarding rule entries, to receive an obfuscated data packet, to identify a forwarding rule entry using a predetermined portion of the obfuscated data packet, and to transmit the obfuscated data packet in accordance with the forwarding rule entry. Further still, one or more of the network nodes 104-114 are configured to de-obfuscate obfuscated data packets using a de-obfuscation function. Network nodes 104-114 are coupled to one another and to controller 102 via a plurality of links or tunnels (e.g., multiprotocol label switching (MPLS) tunnels). Links discussed herein may be physical links, such as, electrical links, optical links, and logical links (e.g., virtual links) used to transport data. While the embodiment of FIG. 1 is disclosed with respect to a particular configuration of controller 102 and network nodes 104-114, it is noted that the system 100 may comprise any suitable number of controllers 102 and network nodes 104-114 or configuration of controller 102 and network nodes 104-114, as would be appreciated by one of ordinary skill in the art upon viewing this disclosure.

Controller 102 is configured to obtain or to establish forwarding rules and keys to communicate obfuscated data packets. For example, controller 102 may be configured to obfuscate routing information for a network using a packet obfuscation function and to generate a plurality of forwarding rule entries. The routing information may comprise destination addresses or may identify flows in the network. In an embodiment, controller 102 is configured to communicate forwarding rules to network nodes 106-112. In an embodiment, network nodes 104 and 114 are configured to obtain packet obfuscation functions and keys from controller 102. Alternatively, network nodes 104 and 114 are configured to obtain keys from other network nodes 104-114, for example, using a dynamic key assignment.

Packet obfuscation functions obfuscate data packets such that the data packets do not resemble or follow conventional formatting structures and, thus, cannot be processed using conventional protocols (e.g., IP protocol and MPLS protocol). The association between obfuscated headers and destinations is unknown to unauthorized network nodes. As such, an unauthorized network node cannot re-encapsulate a data packet to route the data packet to an intended destination. A packet obfuscation function may comprise instructions or algorithms for packet obfuscation and/or instructions or algorithms for packet de-obfuscation, encryption instructions for encrypting and/or decrypting at least a portion of a data packet, and cryptographic instructions for hashing at least a portion of a data packet using one or more keys. Keys may comprise encryption keys for encryption algorithms, authentication keys for cryptographic algorithms, and any other type of keys as would be appreciated by one of ordinary skill in the art upon viewing this disclosure. Forwarding rules may comprise a forwarding table, a lookup table, instructions for determining or associating a forwarding rule entry and an obfuscated data packet, one or more forwarding rule entries, and instructions for routing an obfuscated data packet using a forwarding rule entry. Forwarding rule entries may include, but are not limited to, flows or paths through a network, next-hop identifiers, port identifiers, and network addresses (e.g., IP addresses). A flow refers to a path through a least a portion of the network that comprises one or more network nodes 104-114 along the path.

In an embodiment, a packet obfuscation function applies cryptographic algorithms (e.g., keyed hashing algorithms) to a header portion of a data packet to generate an obfuscated header, and applies encryption algorithms to the header portion and the payload portion of the data packet to generate an obfuscated payload. In another embodiment, the encryption algorithm is applied to only the payload portion of the data packet to generate the obfuscated payload. The obfuscated payload is then encapsulated by the obfuscated header to create an obfuscated data packet. The obfuscated header comprises an obfuscated routing header portion and an obfuscated security header portion. The security header portion may comprise a security parameter index, a sequence number, and authentication data. The security parameter index is used to indicate a key or algorithm for obfuscating or de-obfuscating a data packet. The sequence number is used to prevent replay attacks. Authentication data is data that is created for validating or authenticating an obfuscated data packet. An obfuscated data packet can be authenticated using a key. For example, a cryptographic algorithm and an authentication key can be applied to at least a portion of the obfuscated routing header portion and the obfuscated payload to generate test data. The obfuscated data packet is validated when the test data and the authentication data match.

In an embodiment, a packet obfuscation function is configured to generate an obfuscated header by concatenating routing information (e.g., a destination address or an MPLS tunnel) with random data. The cryptographic algorithm comprises a hashing function (e.g., secure hashing algorithm (SHA) 256) that is applied to the result of the concatenation. The routing information and the result of the hashing function have a one-to-one mapping. A forwarding rule entry in a forwarding table can be established using the result of the hashing function. For example, a forwarding rule entry that is established using a hashing function results is mapped to a flow through the network. The obfuscated header cannot be tampered with by other network nodes that are not configured with the packet obfuscation function and keys. At least a portion of the obfuscated header, for example, the obfuscated routing header portion, may be used to identify a forwarding rule entry in a forwarding table. The obfuscated routing header portion is uniquely assigned to a forwarding rule entry. The payload of the data packet is encrypted using an encryption algorithm (e.g., using advanced encryption standard (AES)-128) and combined with the obfuscated header. The resulting obfuscated data packet is encrypted by the packet obfuscation function. An obfuscated header may be combined with an obfuscated payload in any predetermined position. Packet obfuscation functions may be applied to all of the data packets and may be unique for each forwarding rule entry. Any other suitable packet obfuscation function may be employed to generate an obfuscated data packet that comprises an obfuscated header and an obfuscated payload as would be appreciated by one of ordinary skill in the art upon viewing this disclosure. An obfuscated data packet can be de-obfuscated using a de-obfuscation function and the keys to generate de-obfuscated data packets. A de-obfuscation function may reverse or invert the steps applied to obfuscated data packets by a packet obfuscation function to obtain the original data packets. For example, de-obfuscation functions may de-encapsulate an obfuscated payload from an obfuscated header and reverse steps applied by a packet obfuscation function to retrieve the original header and payload.

Network node 104 is configured to receive a data packet 160, which may for example, be an IP packet sent from a network node in another network. Network node 104 is configured to generate an obfuscated data packet 162 using a packet obfuscation function. Network node 104 is configured to apply a packet obfuscation function to data packet 160 to generate obfuscated data packet 162. In an embodiment, network node 104 may employ one or more keys in conjunction with the packet obfuscation function to generate obfuscated data packet 162. Obfuscated data packet 162 comprises an obfuscated header and an obfuscated payload. Network node 104 is configured to determine that network node 106 is a next-hop for obfuscated data packet 162 using the obfuscated header. Network node 104 uses the obfuscated header to identify a forwarding rule entry that is associated with a flow or a next-hop for obfuscated data packet 162. For example, the obfuscated data packet comprises an obfuscated routing header portion with a value of 0x0011223344556677. A forwarding table may comprise an entry {0, 64, table 2}, which says to use the bits from position 0 to position 63 in an obfuscated data packet as a search key and to use the search key with table 2. Table 2 comprises an entry {0x0011223344556677, eth0/0/0} that corresponds with the search key and indicates that the obfuscated data packet is to be forwarded to interface eth0/0/0. Network node 104 determines that the forwarding rule entry is associated with network node 106. Network node 104 sends obfuscated data packet 162 to network node 106. The obfuscated data packet 162 cannot be tampered with or decrypted by network nodes that are not configured with the packet obfuscation function and keys. Network node 106 is configured to receive obfuscated data packet 162, to determine network node 108 is a next-hop associated with obfuscated data packet 162 using the obfuscated header and the forwarding rules, and to send obfuscated data packet 162 to network node 108. Similarly, network nodes 108-112 are configured to receive obfuscated data packet 162, to determine a next-hop associated with obfuscated data packet 162 using the obfuscated header and the forwarding rules, and to send obfuscated data packet 162 to the next-hop. Network node 114 is configured to receive and de-obfuscate the obfuscated data packet 162. For example, network node 114 is configured to apply a de-obfuscation function to data packet 162 to recover the original data packet 160. Network node 114 is configured to send data packet 160 using routing information (e.g., a destination address) provided in the header of data packet 160.

Figure 2:
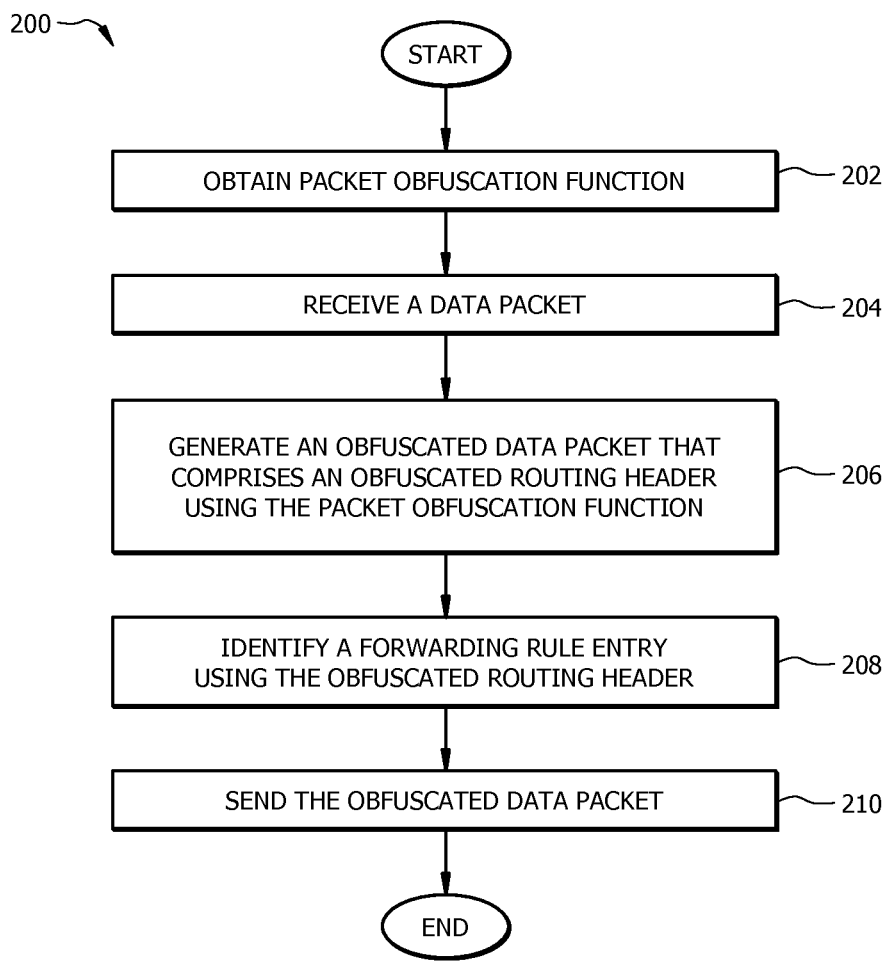
FIG. 2 is a flowchart of an embodiment of a packet obfuscation method for a network element.

FIG. 2 is a flowchart of an embodiment of a packet obfuscation method 200 for a network node. Packet obfuscation method 200 is employed to obfuscate a data packet and to send the obfuscated data packet through a network. In an embodiment, a network node (e.g., network node 104 in FIG. 1) is configured to obtain a packet obfuscation function, one or more keys, and forwarding rules, to obfuscate a data packet using the packet obfuscation function and the one or more keys, and to send the obfuscated data packet. At step 202, the network node obtains a packet obfuscation function and forwarding rules that comprise a plurality of forwarding rule entries. The network node may also obtain one or more keys such as an encryption key and an authentication key associated with the packet obfuscation function. In an embodiment, the network node obtains a packet obfuscation function, keys, and forwarding rules from a controller (e.g., controller 102 in FIG. 1). At step 204, the network node receives a data packet. The data packet may be an IP data packet or any other suitable packet type as would be appreciated by one of ordinary skill in the art upon viewing this disclosure. At step 206, the network node obfuscates the data packet using the packet obfuscation function. The network node applies the packet obfuscation function to the data packet to generate an obfuscated data packet that comprises an obfuscated header and an obfuscated payload. At step 208, the network node uses the obfuscated routing header portion of the obfuscated header to identify a forwarding rule entry in the forwarding table. For example, the forwarding table uniquely associates the obfuscated routing header portion with a flow through the network, or alternatively with a next-hop node in a flow. The network node is only aware of where the obfuscated data packet goes next, based on the obfuscated header. The network node cannot see an entire source route for the obfuscated data packet. Further, the network node cannot reproduce the obfuscated header of a desired source route and cannot modify the obfuscated header to copy the obfuscated data packet to an unauthorized recipient. At step 210, the network node transmits the obfuscated data packet to a next-hop network node in accordance with the forwarding rule entry identified by the obfuscated routing header portion.

Figure 3:
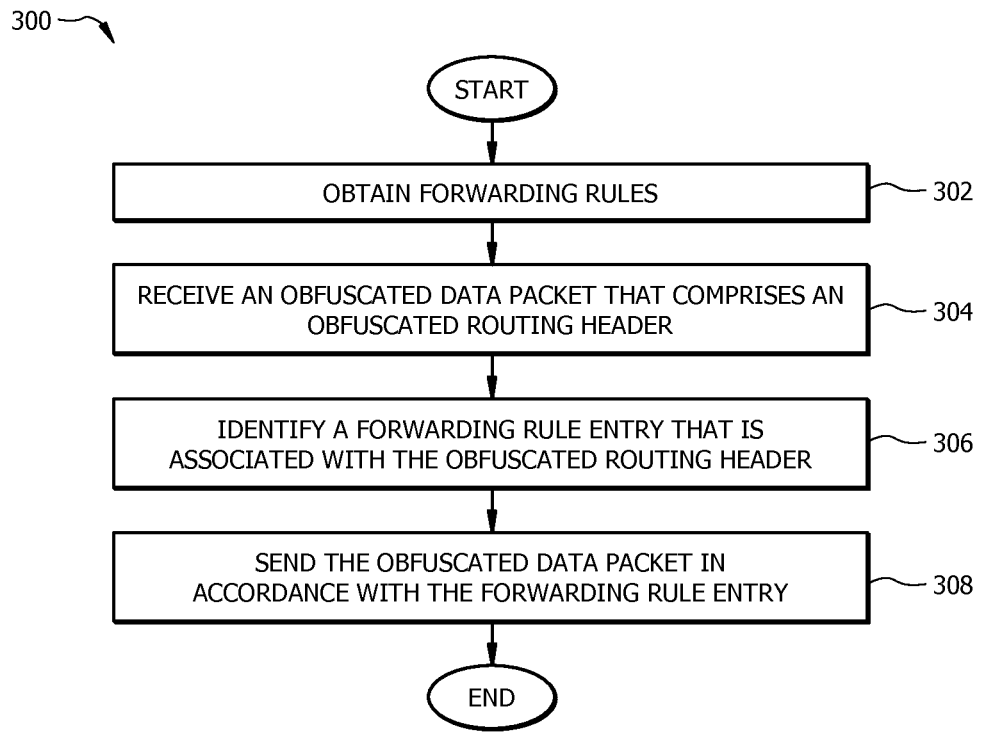
FIG. 3 is a flowchart of an embodiment of a packet forwarding method for a network element.

FIG. 3 is a flowchart of an embodiment of a packet forwarding method 300 for a network node. Packet forwarding method 300 is employed to forward an obfuscated data packet through a network. In an embodiment, a network node (e.g., network nodes 106-112 in FIG. 1) is configured to obtain forwarding rules, to receive an obfuscated data packet, to identify a forwarding rule entry associated with the obfuscated data packet, and to forward the obfuscated data packet in accordance with the forwarding rule entry. At step 302, the network node obtains forwarding rules that comprise a plurality of forwarding rule entries. In an embodiment, the network node receives forwarding rules from a controller (e.g., controller 102 in FIG. 1). At step 304, the network node receives an obfuscated data packet. The obfuscated data packet comprises an obfuscated header and an obfuscated payload. Optionally, the network node may obtain one or more keys and authenticate the obfuscated data packet, for example, using the obfuscated data packet and the keys. At step 306, the network node identifies a forwarding rule entry associated with the obfuscated routing header portion. The obfuscated routing header portion references a forwarding rule entry that is uniquely associated with the obfuscated header. At step 308, the network node transmits the obfuscated data packet along the flow to another network node in accordance with the forwarding rule entry.

Figure 4:
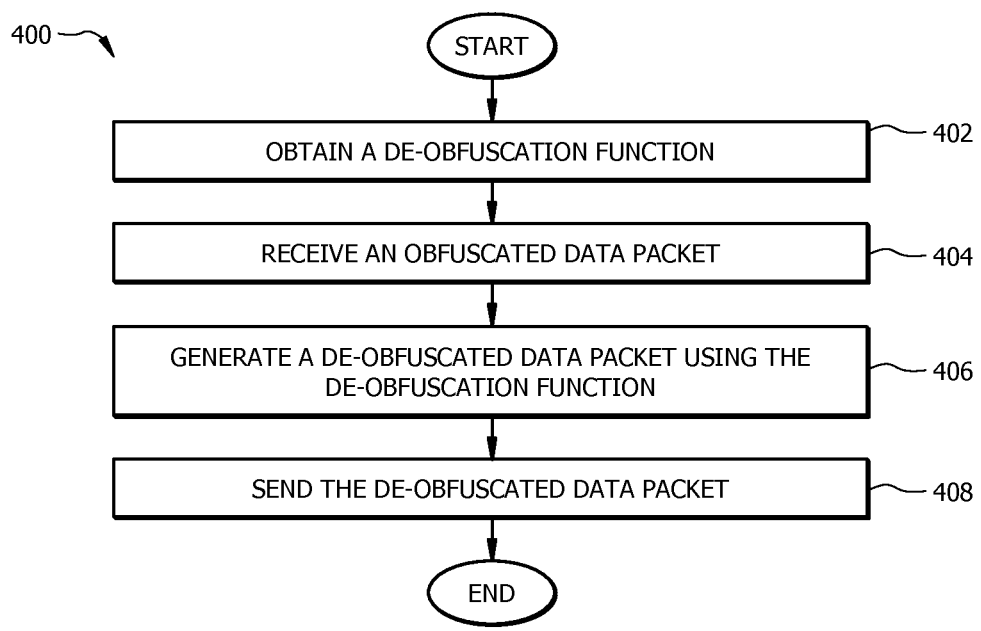
FIG. 4 is a flowchart of an embodiment of a packet de-obfuscation method for a network element.

FIG. 4 is a flowchart of an embodiment of a packet de-obfuscation method 400 for a network node. Packet de-obfuscation method 400 may be employed to de-obfuscate an obfuscated data packet. In an embodiment, a network node (e.g., network node 114 in FIG. 1) is configured to obtain a de-obfuscation function and one or more keys, to receive an obfuscated data packet, to de-obfuscate the obfuscated data packet using the de-obfuscation function, and to send the de-obfuscated data packet. At step 402, the network node obtains a de-obfuscation function. The network node may also obtain one or more keys associated with the de-obfuscation function. In an embodiment, the network node obtains a de-obfuscation function and one or more keys from a controller (e.g., controller 102 in FIG. 1). At step 404, the network node receives an obfuscated data packet. The obfuscated data packet comprises an obfuscated header and an obfuscated payload. Optionally, the network node may authenticate the obfuscated data packet, for example, using the obfuscated data packet and keys. At step 406, the network node de-obfuscates the obfuscated data packet using the de-obfuscation function. In an embodiment, the de-obfuscation function reverses the steps applied to obfuscated data packets by the packet obfuscation function to generate de-obfuscated data packets. At step 408, the network node sends the de-obfuscated data packet to another network node using routing information (e.g., a destination address) provided in the header of the de-obfuscated data packet.

Figure 5:
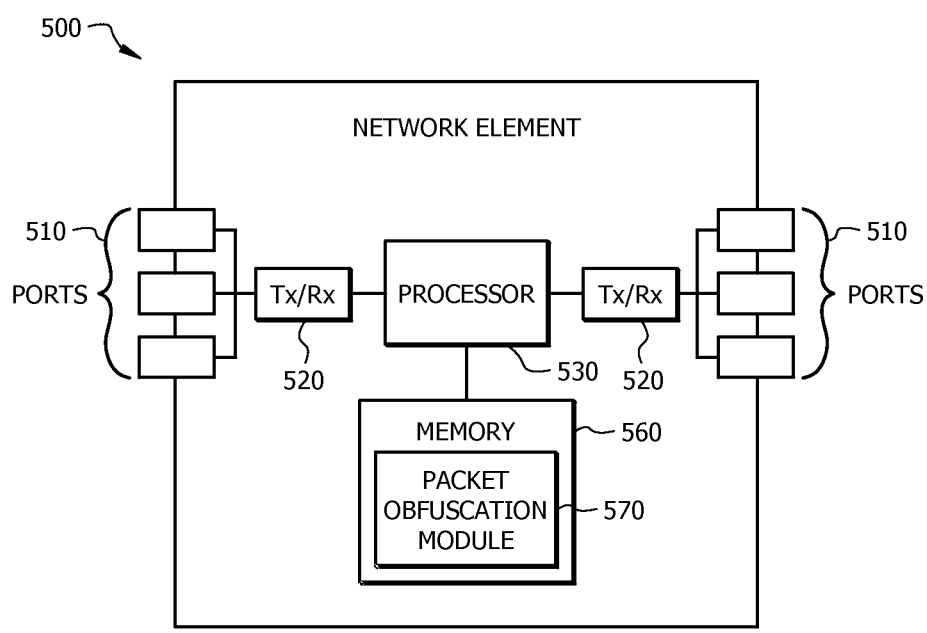
FIG. 5 is a schematic diagram of an embodiment of a network element.

FIG. 5 is a schematic diagram of a network device 500. The network device 500 may be suitable for implementing the disclosed embodiments. For instance, the network device 500 may implement network nodes 104-114 in system 100 and methods 200-400. Network device 500 comprises ports 510, transceiver units (Tx/Rx) 520, a processor 530, and a memory 560 comprising a packet obfuscation module 570. Ports 510 are coupled to Tx/Rx 520, which may be transmitters, receivers, or combinations thereof. The Tx/Rx 520 may transmit and receive data via the ports 510. Processor 530 is configured to process data. Memory 560 is configured to store data and instructions for implementing embodiments described herein. The network device 500 may also comprise electrical-to-optical (EO) components and optical-to-electrical (OE) components coupled to the ports 510 and Tx/Rx 520 for receiving and transmitting electrical signals and optical signals.

The processor 530 may be implemented by hardware and software. The processor 530 may be implemented as one or more central processing unit (CPU) chips, logic units, cores (e.g., as a multi-core processor), field-programmable gate arrays (FPGAs), application specific integrated circuits (ASICs), and digital signal processors (DSPs). The processor 530 is in communication with the ports 510, Tx/Rx 520, and memory 560.

The memory 560 comprises one or more disks, tape drives, and solid-state drives and may be used as an overflow data storage device, to store programs when such programs are selected for execution, and to store instructions and data that are read during program execution. The memory 560 may be volatile and non-volatile and may be read-only memory (ROM), random-access memory (RAM), ternary content-addressable memory (TCAM), and static random-access memory (SRAM). Packet obfuscation module 570 is implemented on processor 530 to execute the instructions for implementing various embodiments such as methods 200-400.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A packet obfuscation method implemented in a first network node, comprising:
   receiving a data packet from a second network node upstream of the first network node, the data packet having a routing header portion and a payload portion;
   performing a first obfuscation on the routing header portion to generate an obfuscated routing header portion;
   performing a second obfuscation on at least the payload portion to generate an obfuscated payload portion;
   combining the obfuscated routing header portion and the obfuscated payload portion to form an obfuscated data packet; and
   identifying a forwarding rule entry using the obfuscated routing header portion.

2. The method of claim 1, wherein the second obfuscation comprises obfuscating only the payload portion to generate the obfuscated payload portion.

3. The method of claim 1, wherein the second obfuscation comprises obfuscating the routing header portion and the payload portion to generate the obfuscated payload portion.

4. The method of claim 1, further comprising generating an obfuscated security header portion that comprises authentication data for verifying the integrity of the obfuscated data packet.

5. The method of claim 1, wherein performing the first obfuscation comprises using a first key to generate the obfuscated routing header portion.

6. The method of claim 5, wherein performing the second obfuscation comprises using a second key different from the first key to generate the obfuscated payload portion.

7. The method of claim 1, wherein the obfuscated routing header portion is uniquely associated with the forwarding rule entry.

8. The method of claim 1, further comprising transmitting the obfuscated data packet in accordance with the forwarding rule entry.

9. The method of claim 1, wherein the forwarding rule entry associates at least a part of the obfuscated routing header portion with a path or a next hop.

10. A packet forwarding method implemented in a network node, comprising:
receiving, by the network node, an obfuscated data packet comprising obfuscated routing information;
using, by the network node the obfuscated routing information to identify a forwarding rule entry from a plurality of forwarding rule entries, the forwarding rule entry identifying a downstream network component to which the obfuscated data packet will be transmitted; and
transmitting, by the network node, the obfuscated data packet to the downstream network component in accordance with the forwarding rule entry.

11. The method of claim 10, wherein the obfuscated data packet contains the obfuscated routing information and an obfuscated routing header portion.

12. The method of claim 11, wherein the obfuscated routing header portion is uniquely associated with the forwarding rule entry.

13. The method of claim 10, wherein transmitting the obfuscated data packet comprises forwarding the obfuscated data packet without modifying the obfuscated data packet.

14. The method of claim 10, wherein the forwarding rule entry is associated with a flow through a network.

15. The method of claim 10, wherein the forwarding rule entry is associated with a destination address.

16. An apparatus comprising:
a transmitter;
a processor coupled to a memory and the transmitter, wherein the memory comprises computer executable instructions stored in a non-transitory computer readable medium such that when executed by the processor causes the processor to:
obfuscate routing information using a packet obfuscation function;
generate a plurality of forwarding rule entries in accordance with the obfuscated routing information;
transmit at least one of the plurality of forwarding rule entries to at least one first network node in a network;
transmit the packet obfuscation function to at least one second network node in the network; and
transmit a de-obfuscation function to at least one third network node in the network.

17. The apparatus of claim 16, wherein obfuscating the routing information comprises using a key.

18. The apparatus of claim 17, wherein the memory comprises computer executable instructions that causes the processor to send the key to the at least one second network node.

19. The apparatus of claim 16, wherein each of the plurality of forwarding rule entries is uniquely associated with a flow through the network.

20. The apparatus of claim 16, wherein each of the plurality of forwarding rule entries is uniquely associated with a destination address.

21. A method of forwarding data packets, comprising:
obfuscating routing information using a packet obfuscation function;
generating a plurality of forwarding rule entries in accordance with the obfuscated routing information;
transmitting at least one of the plurality of forwarding rule entries to at least one first network node in a network;
transmitting the packet obfuscation function to at least one second network node in the network; and
transmitting a de-obfuscation function to at least one third network node in the network.

22. The method of claim 21, wherein obfuscating the routing information comprises using a key.

23. The method of claim 22, further comprising sending the key to the at least one second network node.

24. The method of claim 21, wherein each of the plurality of forwarding rule entries is uniquely associated with a flow through the network.

25. The method of claim 21, wherein each of the plurality of forwarding rule entries is uniquely associated with a destination address.

* * * * *